(12) United States Patent
Roux et al.

(10) Patent No.: US 7,531,072 B2
(45) Date of Patent: May 12, 2009

(54) DEVICE FOR CONTROLLING THE DISPLACEMENT OF A DROP BETWEEN TWO OR SEVERAL SOLID SUBSTRATES

(75) Inventors: Jean-Maxime Roux, Grenoble (FR); Jean-Luc Achard, Grenoble (FR); Yves Fouillet, Voreppe (FR)

(73) Assignees: Commissariat A l'Energie Atomique, Paris (FR); Centre National de la Recherche Scientifique, Paris (FR)

( * ) Notice: Subject to any disclaimer, the term of this patent is extended or adjusted under 35 U.S.C. 154(b) by 885 days.

(21) Appl. No.: 11/056,262

(22) Filed: Feb. 14, 2005

(65) Prior Publication Data

US 2005/0179746 A1 Aug. 18, 2005

(30) Foreign Application Priority Data

Feb. 16, 2004 (FR) .................................. 04 50276

(51) Int. Cl.
G01N 27/447 (2006.01)
G01N 27/453 (2006.01)

(52) U.S. Cl. ....................................... 204/450; 204/600

(58) Field of Classification Search ................ 204/450, 204/600, 547, 643
See application file for complete search history.

(56) References Cited

U.S. PATENT DOCUMENTS

| | | | |
|---|---|---|---|
| 5,170,461 A * | 12/1992 | Yoon et al. | 385/130 |
| 6,565,727 B1 | 5/2003 | Shenderov | 204/600 |
| 6,731,856 B1 * | 5/2004 | Fujita et al. | 385/143 |
| 2002/0043463 A1 | 4/2002 | Shenderov | 204/450 |
| 2003/0164296 A1 | 9/2003 | Squires, et al. | 204/451 |
| 2004/0007377 A1 | 1/2004 | Fouillet et al. | 174/521 |
| 2004/0151828 A1 * | 8/2004 | Zribi | 427/58 |
| 2005/0179746 A1 | 8/2005 | Roux et al. | |

FOREIGN PATENT DOCUMENTS

| | | |
|---|---|---|
| FR | 2 841 063 | 12/2003 |
| JP | 2000-356751 A * | 12/2000 |
| WO | WO 03/045556 A2 | 6/2003 |
| WO | WO 2004/001944 A1 | 12/2003 |

OTHER PUBLICATIONS

English language translation of Eirishi JP 2000-356751 A, patent published Dec. 26, 2000.*
U.S. Appl. No. 11/916,751, filed Dec. 6, 2007, Sauter-Starace, et al.
U.S. Appl. No. 11/917,857, filed Dec. 17, 2007, Sauter-Starace, et al.
Pramod Kolar, http://www.ee.duke.edu/-pkolar, 23 pages, publication date is unknown.

* cited by examiner

Primary Examiner—Alex Noguerola
(74) Attorney, Agent, or Firm—Oblon, Spivak, McClelland, Maier & Neustadt, P.C.

(57) ABSTRACT

A device for reversibly displacing at least one volume of liquid under the effect of an electrical control, including first electrically conductive device, second electrically conductive device, and a device for inducing a reversible displacement of a volume of liquid, from the first to the second electrically conductive devices, without contact with the conductive device during the displacement.

31 Claims, 5 Drawing Sheets

DEVICE FOR CONTROLLING THE DISPLACEMENT OF A DROP BETWEEN TWO OR SEVERAL SOLID SUBSTRATES

TECHNICAL FIELD AND STATE OF THE PRIOR ART

The present invention concerns the displacement and the control of conductive and if necessary polar micro-drops in a liquid medium.

More specifically, it concerns a displacement of conductive micro-drops in a liquid, dielectric or weakly dielectric medium and not miscible with the drops, by means of electro-hydrodynamic forces, between two or several positions that may correspond to specific contact zones on solid substrates.

Liquids have increasing importance in components of small dimensions. Thus, laboratories on chips or "lab-on-chips" are the subject of numerous studies, principally in the fields of biology, chemistry or optics. Micro-fluidics consists in certain cases in circulating small volumes of liquid in micro-machined channels. Another approach consists in manipulating small droplets of liquids. The invention concerns the fluidic protocols characterised by this latter approach.

Although devices exist for displacing and controlling a drop on a horizontal plane by means of a matrix of electrodes, the situation is very different as regards the third dimension, parallel to the axis of gravity.

Given a drop placed on a first substrate, it would be interesting to be able to manipulate this drop to be able to convey it to another substrate, in a zone corresponding to a specific reaction and/or detection and/or observation site.

Consequently, the problem arises of controlling the displacement, particularly the vertical displacement, of a drop between substrates or of the displacement of a drop from a first substrate to a second substrate, not contained in the same plane as the first.

An additional problem is that of being able to displace a first time a drop to make it change substrate, then displacing it again to another substrate, which may be its initial substrate or a third substrate.

The document US 2002/0043463 describes a device that makes it possible to control the horizontal and vertical displacement of a drop thanks to electrowetting. The device described in this document comprises two chambers separated by a perforated wafer comprising orifices allowing the manipulated drop to pass from one chamber to the other. In this device, the drop is permanently in contact with the perforated wafer.

This device enables the three dimensions of space to be exploited for displacing a drop but has major disadvantages for carrying out biological and chemical protocols.

Firstly, it is complex from a technological point of view: it implements 3 levels of substrates, which poses a problem of imperviousness, and problems of alignment; furthermore, this technological complexity is costly.

Problems of contamination and/or biocompatibility also risk occurring given the large drop/substrate contact surface area. Indeed, the drop is confined between two wafers when it is situated in one of two chambers and must flow through an orifice to change chamber.

Finally, the geometry of the device comprising numerous recesses makes it not easy to clean and thus increases the risk of contamination, in particular if different reactions are carried out successively with the same device. These problems are critical if the device is used in reactions bringing into play biological samples, in particular within the scope of a use for analysis purposes.

A device not having these problems is described by Pramod Kolar in a report available on the website: http://www.ee.duke.edu/~pkolar.

The system is composed of two parallel wafers, as in the previous document, and comprises a wire instead of the intermediate wafer. Initially the drop is placed on the lower wafer while still being in contact with the wire then, under the effect of a non-uniform electric field applied between the wire and the upper electrode, the drop is subjected to a vertically oriented force that provokes its displacement towards the upper wafer. The electric wire, as presented by Pramod Kolar, mainly serves to considerably deform the electric field, and to make it non-uniform.

The device described by P. Kolar comprises, for the upper wafer, a substrate intended to be functionalised and to become a DNA chip. The drops may contain DNA intended to be grafted on the surface. This device serves to address the drops containing the probes and the method is presented as a competitive method to the methods normally used in the laboratory for obtaining a DNA chip.

In this device the drops manipulated vertically can unfortunately only be used once, since they wet the surface of the upper wafer of the substrate and therefore cannot be reused. This disadvantage makes the device unusable for carrying out chemical and/or biological protocols, since it provokes the loss of the manipulated micro-reactor. This disadvantage considerably limits the scope of this other invention.

The problem is therefore posed of finding a method that makes it possible to carry out and to control the transfer of a drop of liquid, from a first substrate to a second substrate situated in a different plane, and/or to carry out chemical and/or biological protocols in manipulating drops, in reducing the problems of contamination of the drops and/or reagents and/or samples that are critical, particularly for carrying out chemical and/or biological protocols.

Another problem is that of the re-use of a drop after transfer from a first substrate to a second substrate, as well as the re-use of a device or substrates that have enabled said transfer.

The problem is also posed of controlling the transfer from the second substrate to the first, in other words a reversible displacement.

A yet further problem is that of controlling the time a drop spends on a given substrate.

DESCRIPTION OF THE INVENTION

The invention firstly concerns a device for displacing at least one small volume of liquid under the effect of an electrical control, comprising a first substrate comprising first electrically conductive means, and a second substrate, comprising second electrically conductive means, and means for inducing a reversible displacement of a volume of liquid, from the first means to the second electrically conductive means, without contact with said conductive means during the displacement.

The invention makes use of electrical forces between two substrates, which enable a displacement of at least one drop, initially placed on and partially wetting the first substrate, to a second substrate, comprising second electrically conductive means on which it may be immobilised and maintained according to a controlled duration.

The two substrates may be flat.

The displacement of the drop is reversible and without contact with the substrates or the electrodes during the displacement.

The second electrically conductive means may be covered with a layer of dielectric material that is non wetting or faintly wetting for the liquid of the small volume of liquid.

A contact between the drop and the second substrate is then of controllable duration due to the non wetting or faintly wetting character of the dielectric that covers the second electrically conductive means.

The invention therefore further concerns a device for displacing at least one small volume of liquid under the effect of an electrical control, comprising a first substrate comprising first electrically conductive means, and a second substrate, comprising second electrically conductive means, means for electrically charging a drop, means for displacing a charged drop from the first means to the second electrically conductive means, without contact with said electrically conductive means, and means for maintaining a drop in non wetting contact against the second substrate.

The first electrically conductive means may be hydrophobic.

They may also be covered with a layer of dielectric material, also non wetting by the liquid of the small volume of liquid, and comprise charge transfer means, for example a wire, which may be situated in the vicinity of or against this layer of dielectric material.

According to a variant, the first electrically conductive means comprise at least three electrodes, the first and second charge transfer means being respectively situated in the vicinity of two non-adjoining electrodes.

The first electrically conductive means and/or the second electrically conductive means may comprise a matrix of electrodes, extending along one or two dimensions.

In order to be able to bring the drops into contact with the surfaces at different temperatures, at least one of the substrates may be equipped with temperature control means and/or any other detection and/or observation means.

The invention further concerns a method for displacing a volume of liquid, in which said volume is initially in contact with a first substrate comprising first electrically conductive means, said method comprising the application of a tension between these first electrically conductive means and a second substrate comprising second electrically conductive means, and distant from the first substrate by a distance greater than the diameter of the volume of liquid to be displaced.

The displacement of a drop comprises a phase during which this is not in contact with any solid surface. Furthermore, the displacement is reversible: the drop, after having been transferred onto the second substrate, may be brought back to the first substrate, for example by intervening on the applied electric field. The invention thus enables the drop to go to and fro between two substrates.

The displaced drops may be re-used whatever the direction of the space along which they have been displaced previously.

The invention therefore enables, by means of electrical forces, the displacement of a drop between two or several positions situated on solid substrates that may be functionalised and/or equipped with miniaturisable devices, such as temperature control systems, and/or any other detection and/or observation means.

It also enables the drop to be maintained on the position imposed for a programmed duration.

The first substrate may further comprise, on the first conductive means, a layer of dielectric material that is non wetting for the volume of liquid, charge transfer means being associated with the first substrate for transferring an electrical charge from the volume of liquid when this is in contact with said layer of dielectric material.

The second substrate may comprise a layer of dielectric material that is non wetting for the liquid of which the volume of liquid is composed, this layer being associated with, or situated on or against, the second conductive means.

After displacement to the second substrate, the volume of liquid may be maintained against the layer of dielectric material present on the second electrically conductive means.

Charge transfer means may be associated with the second substrate to transfer an electrical charge from the volume of liquid when this is in contact with the second substrate.

After displacement, the volume of liquid may then be brought back to the first substrate, for example by applying an electric field of sense opposite to that employed for transferring the drop from the first substrate to the second substrate.

According to one embodiment, the first electrically conductive means comprise a first matrix of electrodes, insulated from the liquid media by a dielectric and a hydrophobic coating, the volume of liquid in contact with said hydrophobic coating and a charge transfer electrode moreover being capable, before or after displacement to the second substrate, of being displaced along the length of the first substrate, by successive activation of different electrodes of the first matrix of electrodes.

According to another embodiment, the first electrically conductive means consist of a super-hydrophobic electrode, and the second electrically conductive means of a matrix of electrodes covered with a dielectric coating and advantageously hydrophobic. It is then possible to carry out, by means of electrostatic forces, vertical and horizontal displacements on the second substrate.

According to another embodiment, the first and second electrically conductive means comprise a first and a second matrix of electrodes.

According to an example of possible movement, the volume of liquid may be displaced from an electrode of the first matrix of electrodes to an electrode of the second matrix of electrodes then displaced on the second substrate and/or be brought back to an electrode of the first matrix, the same as or different to the initial electrode.

At least two electrodes of the first matrix and/or at least two electrodes of the second matrix may be taken to temperatures differing from each other.

Furthermore, the first and second substrates may be taken to temperatures differing from each other.

Finally, the device and the method according to the invention may be implemented by applying a uniform field between the two electrodes and/or matrices of electrodes opposite each other.

DETAILED DESCRIPTION OF SPECIFIC EMBODIMENTS

The devices presented will be illustrated with a single drop, but several drops may be manipulated at the same time in these devices.

Figure 1:
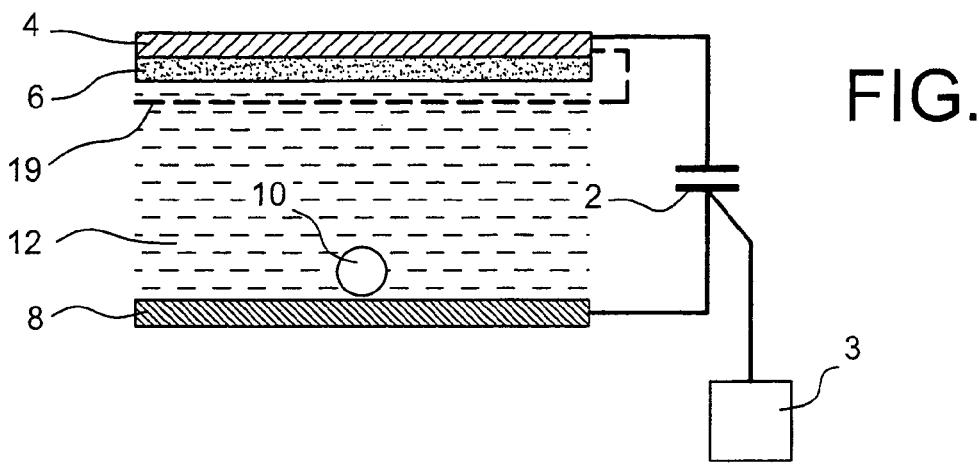
FIG. 1 schematically represents an embodiment of the invention.

FIG. 1 represents a first embodiment of the invention, which illustrates the possibility of displacing a drop by applying an electric field, preferably uniform.

In particular, it is not necessary to impose a deformation of the lines of electric field as in the article of Pramod Kalor by means of an electric wire.

This device according to the invention comprises a tension generator/amplifier 2, which may be programmable or controlled by a computerised device 3, an electrode 4, coated with a dielectric 6 which is non wetting or faintly wetting for the solution from which the drop has come. This coating does not allow electric charges to pass and is advantageously biocompatible.

An electrode 8, advantageously chemically inert and biocompatible, constitutes a charge transfer electrode. If the electrode 8 is too wetted by a drop 10, said drop risks not being able to "disbond" and for this reason the electrode 8 is, preferably, made non wetting or faintly wetting (hydrophobic).

All known means for making it hydrophobic and/or biocompatible may be employed. To achieve this, one may for example, structure the surface and/or use Teflon (at sufficiently low thickness, typically around one hundred nanometres).

A drop 10, for example of several nanolitres to several microlitres, comes from a conductive solution and is initially placed on the lower electrode 8.

The distance between the two surfaces between which the drop is displaced is greater than the diameter of the drop, and is preferably at least around 2 times the diameter of the drop.

It is for example between 100 µm or 150 µm or 500 µm and 1 mm or several mm, for example 5 mm.

Thus the transfer of a drop comprises a phase during which the drop is not in contact with any of the substrates 6, 8.

The drop is in contact with at the most one of the two substrates, which makes it possible to minimise the drop/substrate contact surface area, and thus to reduce the risks of contamination (by chemical and/or biological entities) with the surfaces.

These considerations with regard to the distance between the surfaces of the substrates and its consequences apply equally well to all of the embodiments presented herein.

A dielectric liquid 12, not miscible with the solution of which the drop is composed, bathes the space between the two electrodes.

The drop is brought into movement by applying a continuous electrical tension of sufficient intensity between the two electrodes 4,8. Under the effect of electrical force induced by the applied electric field, the charged drop is displaced vertically and comes against the dielectric 6, which insulates the upper electrode 4.

The drop may be maintained against the dielectric 6, in the upper position, by means of this same electrical force, as long as the electric field is maintained: indeed there is then no charge transfer between the drop and the electrode 4; the field therefore continues to have an effect on the charges borne by the drop.

The drop may be brought to the lower position, either by applying a zero tension to the terminals of the device, and thus by using only the weight of the drop, or by briefly applying an electric field of opposite sense to that previously employed, and this in order to force the movement of the drop by means of an electrical force that is going to act on the charges borne by the drop.

Finally, once the drop nears the lower electrode 8, it discharges itself against said electrode. A zero tension is applied to the terminals of the device to maintain it in the lower position. Indeed, if an electric field exists while the drop is in contact with the charge transfer electrode, the situation is similar to that described previously and leads to the departure of the drop from the electric charge transfer electrode; the drop seems to rebound and turns around to immobilise itself in the upper position.

By way of example of the parameters and dimensions, one may indicate:

for the drop: 2 µl of a saline solution,
 for the electrodes: electrodes distant by 1 centimetre,
 for the supply: continuous +/−2000 volt,
 for the dielectric 6: a wafer of Teflon of 1 millimetre of thickness
 for the dielectric liquid 12: light mineral oil supplied by Sigma, the density of which may be around 0.8.

Figure 2:
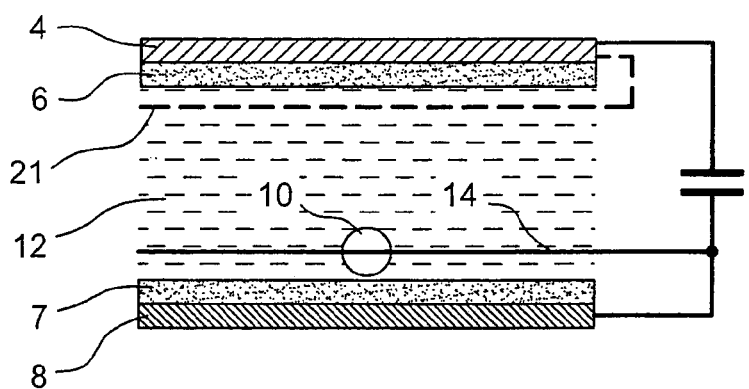
FIG. 2 schematically represents a variant of the device shown in FIG. 1, which is distinguished by the use of a wire instead of a plane as electric charge transfer electrode, FIG. 3 very schematically represents a specific variant of the invention characterised by the presence of two electric charge transfer electrodes, FIG. 4 schematically represents a variant of the device shown in FIG. 2.

FIG. 2 represents a variant of the device shown in FIG. 1, in which the drop 10—transfer electrode 8 contact surface is considerably reduced and the problem of non controlled anchorage of the drop on a site of the electrode 8, by wetting, is practically zero.

This device is therefore that of FIG. 1, to which is added a layer 7 in dielectric material that is non wetting for the solution from which the drop has come and advantageously biocompatible. The transfer of charges through this dielectric cannot take place.

An electric wire 14, of diameter considerably inferior to that of the drop 10, plays the role of electric charge transfer electrode and is advantageously chemically inert and/or biocompatible and/or hydrophobic.

The role of the wire 14 is to allow the transfer of electric charges: the position of this wire is not very important, as long as there is an electrode-drop contact allowing the transfer of electric charges between this wire 14 and the drop 10 when said drop is in contact with the layer 7. In particular, it is possible to deposit a wire on the upper surface of the dielectric 7. By way of example, this wire is in gold.

A dielectric liquid 12, non miscible with the solution of which the drop is composed, bathes the medium between the two dielectrics.

The functioning of this device is the same as in the first embodiment detailed in relation to FIG. 1, but the transfer of charge, in the lower position, is assured by the wire 14. Thus, if an electric field exists while the drop is in contact with a charge transfer electrode, the drop turns around and immobilises itself in the upper position. The same considerations as above are valid as regards the contacts with the substrates and the absence of contact during the displacement from one substrate to the other. The same examples of parameters and dimensions as those already given may be retained for this variant.

A device according to this embodiment therefore comprises a system with at least two electrodes to apply an electric field, and an electric charge transfer electrode 14 with which a drop to be displaced is not in permanent contact. This transfer electrode 14 may be one of the electrodes creating the electric field.

An electric contact between the drop to be displaced and the charge transfer electrode 14 is first established, in particular at the moment when the vertical movement of the drop is going to be provoked for the first time.

The application of an electric field provokes the transfer of electric charges to the drop. Once this step is completed, the drop leaves its departure site, and therefore the transfer electrode, under the effect of an electrical force induced by the applied electric field, and goes to another site belonging to another substrate (the substrate 6) and on which the drop may be maintained by means of the same electrical force. To return the drop to movement and in particular send it back to the site from where it came, one inverses the sense of the electric field during the time of the return. This reverses the sense of the electrical force to which the drop is subjected and forces its departure from the substrate 6 on which it has been maintained previously.

Figure 3:
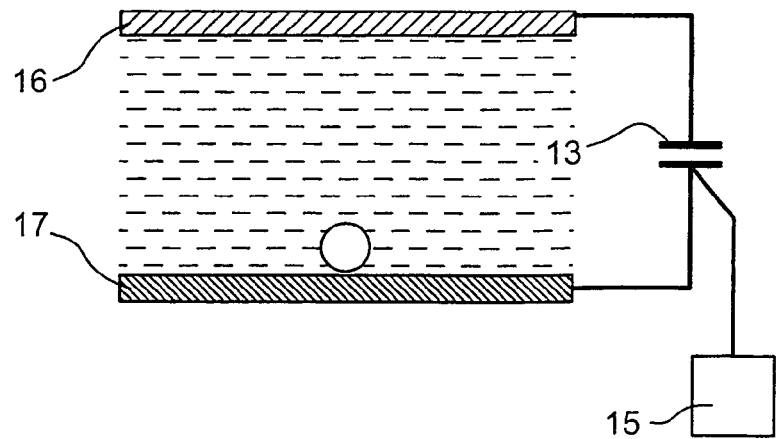

FIG. 3 shows another embodiment, with an electric charge transfer electrode 16, 17 for each position ("upper" and "lower"), and a tension generator amplifier 13, which may be programmable or controlled by computerised means 15.

The electric charge transfer electrodes are very schematically represented in FIG. 3 and, in particular, their form is not detailed. They may be flat as the figure suggests or not. An electric wire may, for example, be used for one or other of these charge transfer electrodes. These electrodes may be coated with a coating providing that the transfer of charges remains possible. In particular, if a dielectric is used, it must be sufficiently thin to allow this transfer.

It is possible to produce the variant shown in FIG.IG. 3 by adding an electric wire connected to the upper electrode 4 in the upper part of the devices shown in FIGS. 1 and 2: these wires 19, 21 are represented as broken lines in FIGS. 1 and 2.

The device shown in FIG. 2 then becomes symmetrical, the two positions "upper" and "lower" being identical.

The behaviour of a drop in such a device, with charge transfer from the side of the two substrates, is different to that of a drop in other devices, in which there is only charge transfer at the level of the lower substrate. Indeed, in the configuration of FIG. 3, when a sufficiently strong continuous electric field is applied, the drop does not possess any stable equilibrium position and is displaced continuously from one electrode to the other. Each electrode enables the transfer of the charges borne by the drop.

Figure 4:
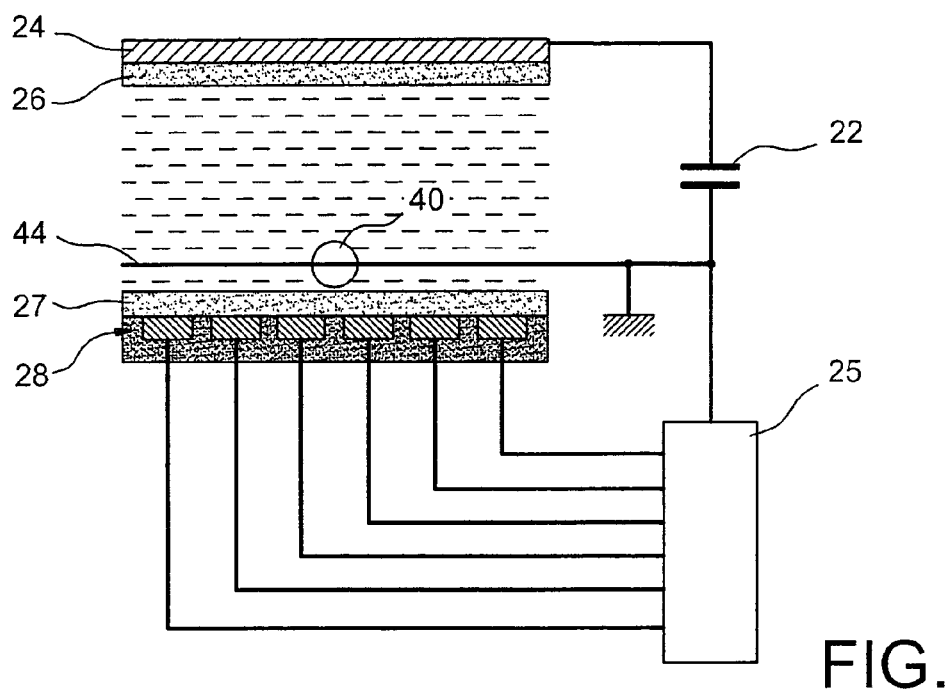

FIG. 4 shows a variant of the device shown in FIG. 2, a variant that comprises a tension generator amplifier 22, which may be programmed or controlled by a computerised device, an upper electrode 24, a lower matrix of electrodes 28, and a device or means 25, which may be programmable, of controlling the electrodes of this matrix and, if necessary, of the generator 22.

Two dielectrics 26,27, non wetting for the solution from which the drop has come, and advantageously biocompatible, cover the electrodes. The charges cannot be transferred through these dielectrics.

An electric wire 44, of diameter considerably inferior to that of the drop, plays the role of electric charge transfer electrode. It is advantageously chemically inert and/or biocompatible and/or hydrophobic.

The position of this wire is immaterial as long as there is an electrode-drop contact, allowing the transfer of electric charges between the wire and the drop when it is in the lower position. In particular, it is possible to deposit a wire on the upper surface of the dielectric 27.

A drop 40 from a conductive solution is initially placed on the dielectric 27.

A dielectric liquid, non miscible with the solution of which the drop is composed, bathes the medium between the two dielectrics.

According to this embodiment, it is possible to control the horizontal displacement of the drop, by electrowetting, according to the method described in the document FR-02 07477, and this by means of the conductive wire 44: by successively activating the different electrodes of the matrix 28, one can displace the drop 40. But according to the invention, one can also displace it vertically according to the same principles as above. One could therefore have a first horizontal displacement or along the plane of the layer 27 (as described in the document cited above) then to the second substrate, or the opposite, therefore a displacement in 3 dimensions.

The device according to the invention is therefore compatible with a displacement of drops by electrowetting on a horizontal substrate.

According to yet another variant, by replacing the upper electrode by a matrix of electrodes, it is possible to vertically manipulate several drops in an independent manner or to dispose of several reaction sites.

Figure 5:
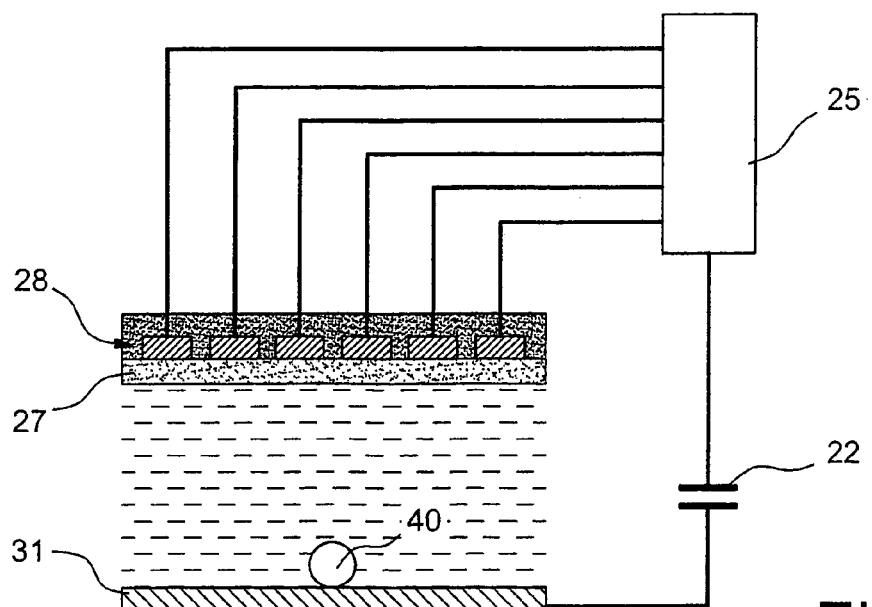
FIG. 5 represents another embodiment of the invention, FIGS. 6A and 6B schematically represent a variant of FIG. 4 such that the vertical displacement of the drops may be organised according to the zones, FIGS. 7A and 7B schematically represent an original device for displacing drops between two lines of electrodes on which the drop may be displaced by electrowetting, FIG. 7A schematically represents the arrangement of the electrodes employed for the horizontal displacement with a catenary on each of the two lines of electrodes, FIG. 7B being a vertical cross-section taken at the level of the column of electrodes perpendicular to the catenaries, FIG. 8 schematically represents a variant of FIG. 4 comprising devices for controlling the temperature of the substrates schematically represented.

FIG. 5 shows an embodiment of the invention in which the drop may be, by means of electrostatic forces and without resorting to the electrowetting necessary with the device shown in FIG. 4, displaced in the horizontal plane.

The drop 40, placed on a super-hydrophobic electrode 31, may be displaced vertically by applying a tension between the two electrodes between which is situated the drop and horizontally by applying a tension between an electrode of the matrix 28 different to that under which the drop is situated.

The operations of maintaining the drop in the upper position and returning the drop to the lower position is carried out as has been detailed for the devices already described.

Figure 6A:
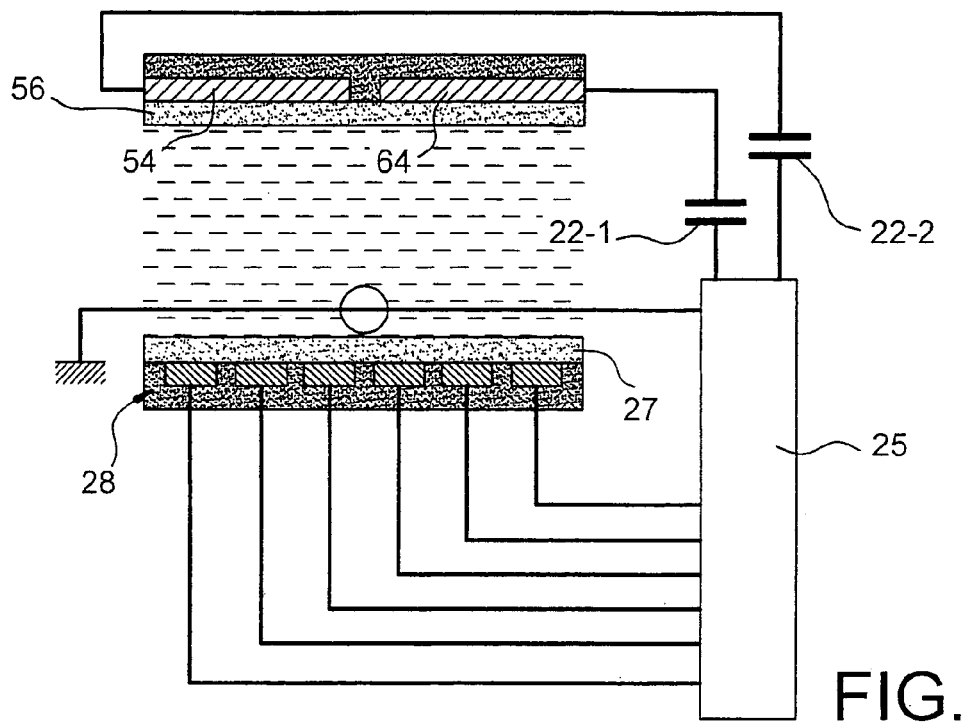

FIG. 6A shown another variant in which the upper electrode is replaced by two electrodes 54,64.

The other elements of this figure are similar or identical to those of FIG. 4 (with two tension generators 22-1, 22-2). The functioning of this device may be the same as that of FIG. 4, with in addition the faculty of modulating the tension of each of the two electrodes 54, 64, and the movement of the drop to one or the other of these two electrodes 54, 64.

Figure 6B:
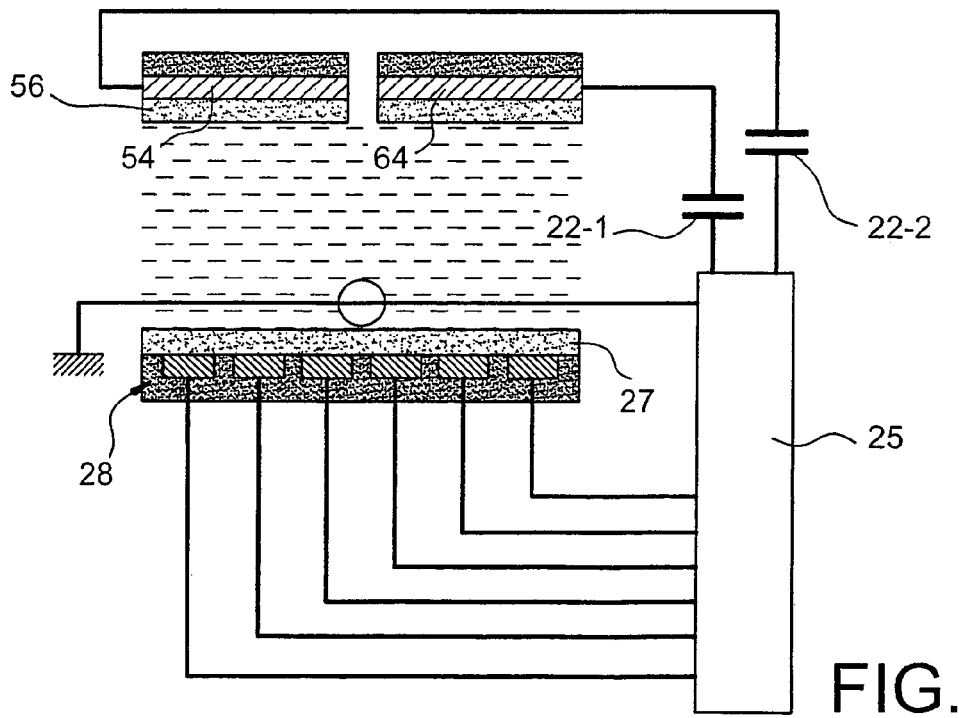

FIG. 6B shows a variant of the device of FIG. 6A, in which a particular substrate corresponds to each upper electrode.

Figure 7A:
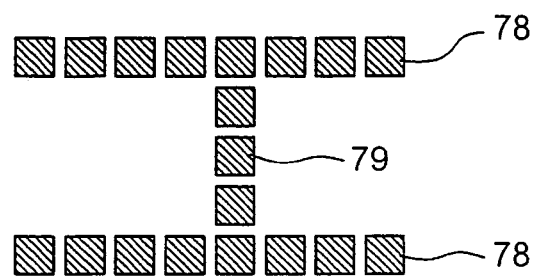
Figure 7B:
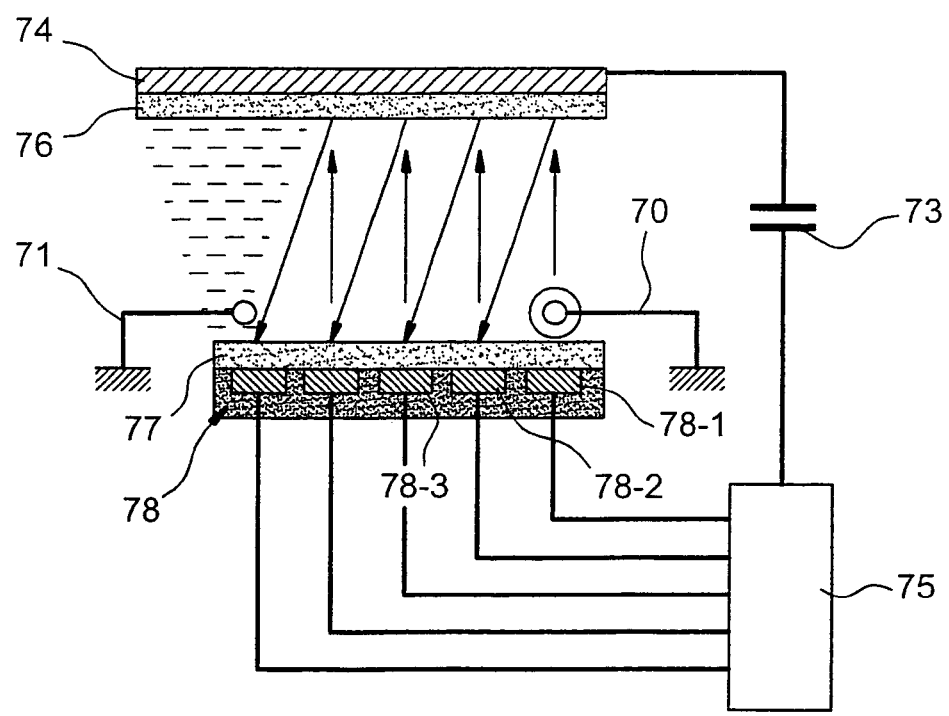

FIGS. 7A and 7B shows a device in which it is possible to operate a movement equivalent to a horizontal displacement by detaching itself temporarily from the catenary. More precisely, let two matrices 78, 79, of electrodes in line employed to displace a drop by electrowetting, according to the method described in the document FR-02 07477. These two matrices are represented by a top view in FIG. 7A.

The drop, initially positioned above the electrode 78-1 and in contact with a transfer electrode, is electrically charged under the effect of the applied electric field then, after displacement, pinned against the dielectric 76 insulating the upper electrode 74 by an electrical force. Tension generating means 73 and means 75, which may be programmable, of controlling the matrix of electrodes 78-i and the generator 73, make it possible to control the application of tensions to the desired electrodes.

It is then possible, by means of an electric field, by polarising the electrode 78-2, to re-lower the drop not to its initial position (above the electrode 78-1) but to a position adjacent to its initial position. The drop then has never touched a conductor since its forced departure and therefore still has an electrical charge. The drop may then be brought to the "upper" position as previously then re-lowered next to its previous "lower" position according to the method already employed. Little by little, the drop is shifted and moves from one line to the other, along the arrowed path represented in FIG. 7B.

Figure 8:
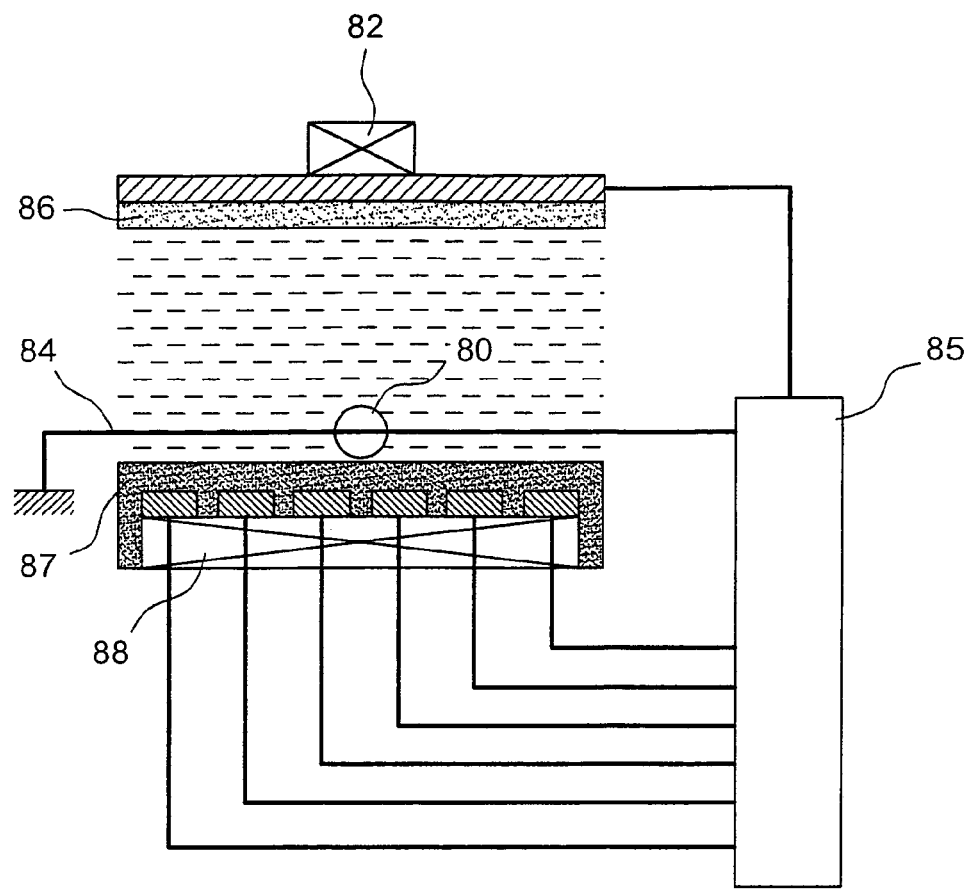

FIG. 8 represents an embodiment in which each wafer is similar to that illustrated in FIG. 7B, and is connected to a temperature control device 82, 88.

The embodiment in FIG. 8 comprises a longitudinal transfer electrode 84, as in FIG. 5 for example, and with the same functions.

At each change of wafer, the drop may change temperature if the wafers are taken to different temperatures by the means 82 and 88.

In addition to the imposed temperature changes, it is possible to carry out a movement of the drops according to the above-mentioned explanation in relation to FIG. 4 for example.

Temperature control means may be applied to each of the devices of FIGS. 1-7B, on one or several electrodes of these devices, or on one or several segments of the substrate, on which the electrodes are etched.

In particular, in the case of FIG. 6A, they are temperature control devices 3 that may be used, two in combination with the electrodes 54, 64 and one for controlling the temperature of the electrode matrix 28.

Thus, one may carry out a thermal cycling of a drop between 2 temperatures (FIG. 8) or 3 temperatures.

Among the applications of the invention, one may cite the Polymerase Chain Reaction (PCR), which is a reaction in which it is possible, thanks to the invention, to reduce the duration. Indeed, this reaction requires the carrying out of a long thermal cycle. It consists in a thermal cycling of a reaction mixture between two or three temperatures and is conventionally carried out on very small quantities, of around several microlitres.

Let micro-drops stem from the reaction mixture, usually known as the mix-PCR. They may be transferred rapidly from one wafer to the other of the device shown schematically in FIG. 8, under the action of a suitable electric field.

Each wafer is connected to a temperature control device 82, 88. The two wafers may therefore be taken to different temperatures. In this case, at each change of wafer, the drop changes temperature. PCR reactions may be carried out at two temperatures, and therefore the two single positions wafer high/wafer low suffice for the realisation of the protocol.

To carry out PCR protocols at three temperatures, one uses three heating sites, as explained above. A drop displacement device, already described above, makes it possible to horizontally displace one or several drops and to bring them for example under a given heating site. If two heating sites are present on two electrodes such as electrodes 54, 64 of FIGS. 6A et 6B, with a heating device regulating the temperature of the substrate in which the matrix of electrodes (28) has been engraved. It is then possible to subject the drop to a thermal cycling between three temperatures and thus to carry out a PCR at three temperatures.

The transfer time of the reaction mixture between one temperature and another is then extremely short, even negligible, compared to that of conventional devices, which carry out temperature changes in several seconds.

Obviously, applications other than PCR exist:

For example, it is possible, with the device of the invention, to study certain physical parameters of the manipulated drops. Let a drop be placed above an electrode: it is possible, by subjecting it to a suitable alternating field, to make it vibrate. The observation and the study of the vibration modes adopted by the drop provide information on certain rheological parameters (viscosity, surface tension, etc.).

In a general manner, whatever the envisaged embodiment, the invention enables the displacement of a drop along two or three directions of space, while allowing the re-use of a displaced drop.

Whatever the envisaged embodiment, the invention enables very rapid displacements (from several tens to several hundreds of milliseconds) of at least one drop between two specific positions. This property may be exploited with the aim of reducing the time for carrying out certain chemical and/or biological protocols, in particular when cycles have to be carried out.

Problems of contamination and/or biocompatibility are reduced to their strict minimum. Furthermore, the drop/electrode contact is of controllable duration.

Whatever the embodiment, the drop only comes into contact with a single substrate at any one time. This makes it possible to minimise the drop/substrate contact surface and thus to reduce the risks of contamination with the surfaces of the component (absorbed chemical and/or biological entities). Moreover, if a drop has to be heated and then cooled, it is only in contact with a single substrate; the simultaneous contact with a second substrate would result in thermal losses, which is avoided with the present invention.

Finally, the drop/substrate contact surface is adjustable by playing on the nature of the coatings and the tensions used, which determine the impacts.

A device according to the invention may be produced by means of micro-technology methods. For example, on a glass substrate, one forms a matrix of electrodes 28 in gold of thickness 0.2 µm. A first passivation layer is obtained by a deposition of silicon nitrate Si3N4 (PECVD) of thickness 0.2 µm. Then, one uses a resin (EPON-SU8) of 100 µm thickness to form a framework that serves as a support for the microcatenary 44. In order to make the surface hydrophobic with little hysterisis, one may use a silane (e.g. octadecyl trichlorosilane), or a parylene covering, or a Teflon coating.

Good results have been obtained with a layer of Teflon AF 1601S (DuPont). To obtain a homogeneous layer of low thickness (1 µm), Teflon is deposited by spin-coating.

After cutting of the substrate, the chips are bonded to a standard ceramic package. A ball bonding machine traditionally used in microelectronics makes it possible to form the microcatenaries and electrical bridges to connect the electrodes to the package. The wires used have for example a diameter of 25 µm and are in gold.

According to a variant, the charge transfer electrodes may be lines structured by microtechnology directly on the dielectric, which insulates the electrodes of the matrix. The surface is then made hydrophobic by the deposition of a layer of Teflon, typically of thickness of around one hundred nanometres.

According to another variant, the matrices of electrodes may be active matrices. In this respect, one could refer to the patent WO 03/045556 A2.

The cover of the device is a glass surface, the lower face of which has been covered with a thin, conductive and optically transparent film of ITO (indium tin oxide). This layer constitutes the upper electrode of the device. It is insulated and made hydrophobic by a deposit of Teflon AF 1601S (DuPont).

Such a method may be adapted to the formation of devices according to one or other of the embodiments described above.

The heating devices 82 will be for example heating resistors or Peltier effect modules.

In certain configurations (in particular that of FIGS. 1 (electrode 8), 3 (electrode 17 and/or 16), and 5 (electrode 31)) one aims to dispose of surfaces that are both very hydrophobic, to limit the capillary forces that may oppose the displacements of the droplets, and conductive. These constraints seem antagonistic in so far as conductive surfaces are generally metallic and metals are rather hydrophilic.

It is possible to overcome this contradiction by using, in a device and a method according to the invention, a conductive surface covered with a hydrophobic polymer film sufficiently thin to allow the transfer of electric charges. It is in particular possible to employ a textured conductive surface, in other words rough, and covered with a very thin polymer film that is non wetting for the drop.

An example of an embodiment of such a film is described in the document FR-03 51137, which concerns in particular the formation of super hydrophobic polymers obtained by physical dry process. Indeed, carbon nanotubes (CNT) are conductive and their deposition on a conductive surface enables said surface to be textured; a polymer film enables the surface to be made non wetting.

More precisely, a device with a hydrophobic and/or lipophobic surface may comprise a cover of nanofibres, for example of carbon, said carbon nanofibres being sheathed or totally sheathed by a continuous hydrophobic and/or lipophobic polymer film, for example of polysiloxane or a fluorocarbon polymer, the surface between these nanofibres being covered by a layer of this same polymer.

One method for forming a device with a hydrophobic and/or lipophobic surface then comprises the following steps:
deposition of nanofibres on a surface of said device,
sheathing of these nanofibres by a hydrophobic and/or lipophobic polymer, achieved by a dry process physical technique, or by an electro-grafting technique.

For example this method comprises the following steps:
a step of depositing carbon nanofibres on a surface of a part, which successively comprises:
a deposition of catalyst by a PVD method ("Physical Vapour Deposition"), said catalyst being deposited under vacuum at a pressure of several $10^{-3}$ mbar, a target composed of a catalytic material being bombarded by a flux of ionised argon, the atoms of the target thus ejected covering this surface,
the introduction of the part thus covered into the enclosure of a CVD oven under vacuum in order to carry out the deposition of carbon nanofibres, the catalyst first being formed into a drop under the effect of the rise in temperature of the part, a hydrocarbon precursor then being introduced into this enclosure, the growth of the carbon nanofibres occurring at the place where the catalyst formed into a drop.
a step of sheathing of the nanofibres by a hydrophobic polymer with a PECVD technique ("Plasma enhanced chemical vapour deposition") or by an electro-grafting technique.

During the deposition step, the pressure is for example between 0.1 and 3 mBar. A polysiloxane (hexamethyl disiloxane, octamethyl cyclotetrasiloxane, hexamethyl disilane, diphenyl methylsilane, etc.) or fluorocarbon precursor is introduced into the enclosure and diluted in a carrier gas (Ar, He, H2, etc.). The thickness of the cover of nanofibres deposited is around one hundred nanometres.

This technique enable the formation of hydrophobic nanofibres that make it possible to obtain very high contact angles of a liquid on a solid: for example greater than 160°.

Figure 9:
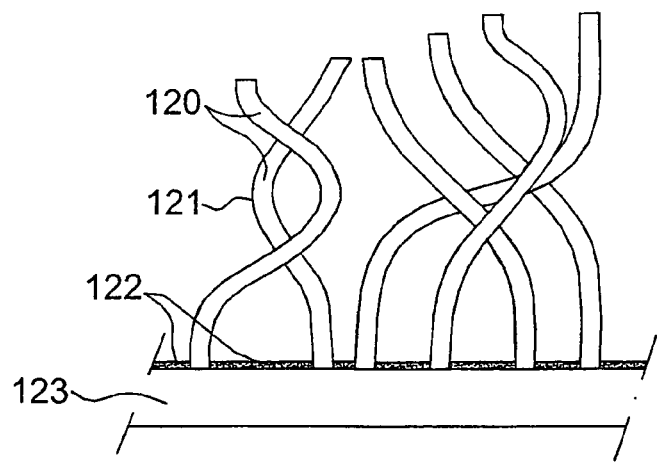
FIG. 9 schematically represents a hydrophobic surface, with a cover of nanofibres sheathed by a polymer.

FIG. 9 represents a device of this type, with a hydrophobic and/or lipophobic surface, comprising a cover of nanofibres 120, which are totally sheathed by a continuous hydrophobic and/or lipophobic polymer film 121. The surface 122 existing between these nanofibres is also covered by a layer of this same polymer.

The continuity of the polymer film enables the bonding or the solid fastening of the nanofibres on the surface 123.

The sheathing may be achieved by dry process physical deposition technique or by an electrografting technique.

One may thus have the following characteristics:
example of nanofibres used: carbon nanofibres,
example of polymer film used: polysiloxane or fluorocarbon polymer,
diameter of a nanofibre 120: around 20 to 30 nm,
length of a nanofibre: around 3 μm,
thickness of the hydrophobic polymer film: around 50 nm.

According to yet another example, a device such as that in FIG. 1 may be formed with the following parameters:
Distance between the electrodes: around 7 mm,
Lower electrode: of the nanofibre type sheathed with a polymer film, as explained above,
Dielectric liquid: mineral oil of density 0.84,
Liquid employed for a drop: 0.5M aqueous solution of sodium chloride,
Volume of a drop: 2 μl,
Tension necessary for the disbanding of a drop: around 950V.

The invention claimed is:

1. Device for reversibly displacing at least one volume of liquid under the effect of an electrical control, comprising a first electrical conductor, a second electrical conductor, and means for inducing a reversible displacement of a volume of liquid, from said first to said second electrical conductor, without contact with said electrical conductors during said displacement, wherein said reversible displacement includes a phase during which said volume of liquid is not in contact with any solid surface.

2. Device according to claim 1, said second electrical conductor being covered with a layer of a non wetting or faintly wetting dielectric material.

3. Device according to claim 1, said second electrical conductor comprising a cover of nanofibres sheathed by a continuous hydrophobic and/or lipophobic polymer film.

4. Device according to claim 3, wherein said nanofibres are carbon nanofibres, and said polymer film is a film of polysiloxane or a fluorocarbon polymer.

5. Device according to claim 1, said first electrical conductor being hydrophobic.

6. Device according to claim 1, said first electrical conductor comprising a cover of nanofibres sheathed by a continuous hydrophobic and/or lipophobic polymer film.

7. Device according to claim 6, wherein said nanofibres are carbon nanofibres and said polymer film is a film of polysiloxane or a fluorocarbon polymer.

8. Device according to claim 1, further comprising means of applying a tension between said first and said second electrical conductors.

9. Device according to claim 1, said first electrical conductor comprising a matrix of electrodes, extending along one or two dimensions.

10. Device according to claim 1, said second electrical conductor comprising a matrix of electrodes.

11. Device according to claim 1, said first and/or said second electrical conductor being equipped with a temperature controller.

12. Device according to claim 11, one or the other of said first or second electrical conductors being equipped with at least two temperature controllers.

13. Device for reversibly displacing at least one volume of liquid under the effect of an electrical control, comprising a first electrical conductor, a second electrical conductor, and means for inducing a reversible displacement of a volume of liquid, from said first to said second electrical conductor, without contact with said electrical conductors during said displacement, said first electrical conductor being covered with a layer of non wetting or faintly wetting dielectric material and comprising charge transfer means.

14. Device according to claim 13, in which said charge transfer means comprise a wire.

15. Device according to claim 13, said charge transfer means being situated in the vicinity of or against said layer of dielectric material deposited on said first electrical conductor.

16. Device according to claim 13, said first electrical conductor comprising at least three electrodes, first and second charge transfer means being respectively situated in the vicinity of two non adjacent electrodes among said at least three electrodes.

17. Device for reversibly displacing at least one volume of liquid under the effect of an electrical control, comprising a first electrical conductor, a second electrical conductor, and means for inducing a reversible displacement of a volume of liquid, from said first to said second electrical conductor, without contact with said conductors during said displacement, said first electrical conductor being covered with a layer of non wetting or faintly wetting dielectric material and comprising charge transfer means.

18. Method for displacing a volume of liquid having a diameter, in which said volume is initially in contact with a first substrate comprising a first electrical conductor means, said method comprising:
applying a tension between said first electrical conductor and a second substrate comprising a second electrical conductor, and distant from said first substrate by a distance greater than said diameter of said volume of liquid to be displaced, and displacing said volume of liquid from said first substrate to said second substrate, then displacing said volume of liquid from said second substrate to said first substrate.

19. Method according to claim 18, said first substrate further comprising, on said first conductor, a layer of dielectric material non wetting for said volume of liquid, charge transfer means being associated with said first substrate for transferring an electrical charge from said volume of liquid when this is in contact with said layer of dielectric material.

20. Method according to claim 18, said second substrate comprising a layer of dielectric material non wetting or faintly wetting for a liquid of which said volume of liquid is constituted, said layer being present on said second conductor.

21. Method according to claim 20, said volume of liquid being, after displacement to said second substrate, maintained against said layer of dielectric material present on said second electrical conductor.

22. Method according to claim 20, said charge transfer means being associated with said second substrate for transferring an electrical charge from said volume of liquid when this is in contact with said second substrate.

23. Method according to claim 18, said volume of liquid being displaced from said second substrate to said first substrate by applying an electric field of opposite sense to that employed for transferring said volume from said first substrate to said second substrate.

24. Method according to claim 18, said first electrical conductor comprising a first matrix of electrodes.

25. Method according to claim 24, said volume of liquid being further displaced along a length of said first substrate, by successive activation of different electrodes of said first matrix of electrodes.

26. Method according to claim 25, said volume of liquid being displaced from a position on said first substrate located above a first electrode of said matrix of electrodes to said second substrate, then being brought back to said first substrate, to a position situated above a second electrode different to said first electrode.

27. Method according to claim 24, at least two electrodes of the first matrix being taken to temperatures that differ from each other.

28. Method according to claim 18, said second electrical conductor comprising a second matrix of electrodes.

29. Method according to claim 28, at least two electrodes of the second matrix being taken to temperatures that differ from each other.

30. Method according to claim 18, said first and second substrates being taken to temperatures that differ from each other.

31. Method according to claim 18, said volume of liquid being subjected to an alternating field.

* * * * *